US008211572B2

(12) United States Patent
Cho et al.

(10) Patent No.: US 8,211,572 B2
(45) Date of Patent: Jul. 3, 2012

(54) FABRICATION METHOD FOR ELECTRODE ACTIVE MATERIAL AND LITHIUM BATTERY COMPRISING ELECTRODE ACTIVE MATERIAL FABRICATED THEREFROM

(75) Inventors: Byung-Won Cho, Seoul (KR); Kyung-Yoon Chung, Seoul (KR); Joong-Kee Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 810 days.

(21) Appl. No.: 12/261,950

(22) Filed: Oct. 30, 2008

(65) Prior Publication Data

US 2009/0117464 A1    May 7, 2009

(30) Foreign Application Priority Data

Nov. 7, 2007    (KR) ........................ 10-2007-0113392

(51) Int. Cl.
*H01M 4/58*    (2010.01)
*H01M 4/52*    (2010.01)
*C01D 1/02*    (2006.01)
*C01G 53/04*   (2006.01)
*C01G 31/02*   (2006.01)
*C01G 51/04*   (2006.01)
*C01G 23/04*   (2006.01)
*C01G 45/12*   (2006.01)
*C01B 25/30*   (2006.01)
*H01M 4/50*    (2010.01)

(52) U.S. Cl. .................... 429/231.95; 429/221; 429/223; 429/224; 429/231.1; 423/594.6; 423/599; 423/594.4; 423/306; 423/594.17; 423/598

(58) Field of Classification Search ........................ None
See application file for complete search history.

(56) References Cited

U.S. PATENT DOCUMENTS

2003/0049534 A1*  3/2003  Maeda et al. .............. 429/231.6

OTHER PUBLICATIONS

Kim, et al., "Electrochemical properties of $LiM_xCo_{1-x}O_2$ [M=Mg, Zr] prepared by sol—gel process," Journal of Power Sources 138 (2004) pp. 232-239.

* cited by examiner

*Primary Examiner* — Krishnan S Menon
(74) *Attorney, Agent, or Firm* — Vierra Magen Marcus & DeNiro LLP

(57) ABSTRACT

Disclosed is a fabrication method for an electrode active material, and a lithium battery comprising an electrode active material fabricated therefrom. The fabrication method for an electrode active material comprises preparing an aqueous solution by dissolving a precursor that can simultaneously undergo positive ion substitution and surface-reforming processes in water; mixing and dissolving raw materials for an electrode active material with a composition ratio for a final electrode active material in the aqueous solution, thereby preparing a mixed solution; removing a solvent from the mixed solution, thereby forming a solid dry substance; thermal-processing the solid dry substance; and crushing the thermal-processed solid dry substance.

9 Claims, 3 Drawing Sheets

FABRICATION METHOD FOR ELECTRODE ACTIVE MATERIAL AND LITHIUM BATTERY COMPRISING ELECTRODE ACTIVE MATERIAL FABRICATED THEREFROM

RELATED APPLICATION

This application claims priority from Korean Patent Application No. 10-2007-0113392, filed on Nov. 7, 2007, which is herein expressly incorporated by reference in its entirety.

BACKGROUND OF THE INVENTION

1. Field of the Invention

The present invention relates to a fabrication method for an electrode active material and a lithium battery comprising an electrode active material fabricated therefrom, and more particularly, to a fabrication method for an electrode active material capable of implementing an excellent life span and high performance by utilizing a precursor, the precursor prepared by undergoing positive ion substitution and surface-reforming processes through one process without using a chelating agent, and a lithium battery comprising an electrode active material fabricated therefrom.

2. Description of the Background Art

Metallic compounds and phosphorous oxides being currently used as a cathode active material for lithium secondary batteries include $LiCoO_2$, $LiMn_2O_4$, $LiMnO_2$, $LiNiO_2$, $LiNiCoO_2$, $V_6O_{13}$, $V_2O_5$, $LiFePO_4$, $Li_3Fe_2(PO_4)_3$, etc. Transition metallic oxides used as an anode active material include $Li_4Ti_5O_{12}$, etc. A cathode active material for lithium primary batteries includes $MnO_2$, etc.

These materials are generally fabricated by a solid phase method. During the fabrication process, the electrode active materials have to be mixed and crushed in a physical manner. Accordingly, a mixed state of the electrode active materials becomes non-uniform. This causes repetitive sintering and crushing processes, thereby increasing fabrication costs and fabrication duration. Furthermore, after the repetitive sintering and crushing processes, there may occur problems in uniformity of particle sizes and in homogeneity of chemical composition.

Charging and discharging processes for lithium batteries are performed by a diffusion process of lithium ions. Accordingly, uniformity of particle sizes and homogeneity of chemical composition greatly influence on characteristics of electrodes (cathode, anode) for lithium batteries. Accordingly, it is very important to control uniformity of particle sizes and homogeneity of chemical composition. In order to enhance characteristics of an electrode active material, a small amount of hetero-element may be doped or a surface-reforming process may be performed. However, in this case, the homogeneity of chemical composition may severely deteriorate.

In order to solve the problems of the solid phase method, a liquid phase method has developed. A representative of the liquid phase method includes a sol-gel process (A. Manthiram et al., chemistry of Materials, 10, pp 2895-2909 (1998)). When transition metallic oxide powder is fabricated by using the sol-gel process composed of hydrolysis and condensation, lithium ions and transition metallic ions are mixed in nano sizes, thereby having a particle size much smaller that that of powder fabricated by a solid phase method. Accordingly, by the sol-gel process, an electrode active material having a large surface area, a uniform particle size, and a uniform composition can be obtained. Furthermore, the sol-gel process can reduce fabrication time since repetitive sintering and crushing processes are not required, and can reduce fabrication costs since an electrode active material can be synthesized at a lower temperature than in a solid phase method. Accordingly, the sol-gel process is effective to uniformly synthesize electrode active material powder for a lithium battery in nano size, or to dope a hetero-element.

However, the sol-gel process is not effective to a surface-reforming process, and requires an additional chelating agent. Furthermore, the sol-gel process causes a difficulty in a massive production due to its complicated processes.

SUMMARY OF THE INVENTION

Therefore, it is an object of the present invention to provide a fabrication method for an electrode active material capable of implementing an excellent life span and high performance by utilizing a precursor, the precursor prepared by undergoing positive ion substitution and surface-reforming processes through one process without using a chelating agent, and a lithium battery comprising an electrode active material fabricated therefrom.

To achieve these and other advantages and in accordance with the purpose of the present invention, as embodied and broadly described herein, there is provided a fabrication method for an electrode active material, comprising: preparing an aqueous solution by dissolving a precursor that can simultaneously undergo positive ion substitution and surface-reforming processes in water; mixing and dissolving raw materials for an electrode active material with a composition ratio for a final electrode active material in the aqueous solution, thereby preparing a mixed solution; removing a solvent from the mixed solution, thereby forming a solid dry substance; thermal-processing the solid dry substance; and crushing the thermal-processed solid dry substance.

Here, the precursor may include at least one of Zirconium (IV) Acetate Hydroxide, Aluminum Acetate Basic, and Chromium (III) Acetate Hydroxide.

Here, the raw materials for an electrode active material may include one or more metallic compounds, a dopant and metallic salt for surface-reforming.

The metallic compounds may include at least one of lithium compounds, cobalt compounds, nickel compounds, manganese compounds, iron compounds, and titanium. The dopant may include at least one of Mg, Al, Co, Ni, K, Na, Ca, Si, Fe, Cu, Zn, Ti, Sn, V, Ge, Ga, B, P, Se, Bi, As, Zr, Mn, Cr, Ge, Sr, V, Sc and Y, or a mixture thereof. The metallic salt for surface-reforming may include at least one of $Al_2O_3$, $SnO_2$, $MgO$ and $ZrO_2$.

Here, the final electrode active material may include one of $LiCoO_2$, $LiMn_2O_4$, $LiMnO_2$, $LiNiO_2$, $LiNiCoO_2$, $LiFePO_4$, $Li_3Fe_2(PO_4)_3$, $LiMnPO_4$, $LiCoPO_4$, $LiCo1/3Ni1/3O_2$, $LiNi0.5Mn0.5O_2$, $LiNi0.5Mn1.5O_4$, $V_6O_{13}$, $V_2O_5$, and $Li_4Ti_5O_{12}$.

The solvent of the mixed solution may be removed by either a drying process or a solvent extracting process.

One of the metallic compounds, the dopant, and the metallic salt for surface-reforming may be further added to the aqueous solution with a composition ratio higher than the composition ration for a final electrode active material by 0%~15%.

Preferably, the mixed solution is prepared so that an entire concentration of the precursor and the raw materials for an electrode active material can be in a range of 0.1M~20M.

The drying process may be performed for 10 minutes~72 hours at a room temperature or at a temperature of 300° C. under vacuum or atmospheric conditions.

The thermal-processing may be performed one or plural times for 30 minutes~24 hours at a temperature of 350° C.~1300° C.

The solid dry substance may have an average particle size of 5 nm~15 μm.

To achieve these and other advantages and in accordance with the purpose of the present invention, as embodied and broadly described herein, there is also provided a lithium battery comprising a cathode or an anode, the cathode or anode fabricated by using an electrode active material fabricated by one of claims 1 to 9.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
FIG. 1 shows a scanning electron microscope (SEM) photo of a cathode active material of LiCoO2 fabricated in the present invention.

Reference will now be made in detail to the preferred embodiments of the present invention, examples of which are illustrated in the accompanying drawings.

Hereinafter, a fabrication method for an electrode active material, and a lithium battery comprising an electrode active material fabricated therefrom according to the present invention will be explained.

The fabrication method for an electrode active material will be explained.

First, one or two or more precursors of Zirconium(IV) Acetate Hydroxide ((CH3CO2)xZr(OH)y, x+y=4), Aluminum Acetate Basic, and Chromium(III) Acetate Hydroxide are dissolved in water, thereby fabricating aqueous solution. Here, a precise amount of metallic ions are dissolved. The precursors of Zirconium(IV) Acetate Hydroxide, Aluminum Acetate Basic, and Chromium(III) Acetate Hydroxide are starting materials for positive ion substitution and surface-reforming processes. As water, distilled water may be used.

Then, at least one of a final metallic compound to be synthesized, a dopant, metallic salt for surface-reforming, etc. are mixed and dissolved with a composition ratio for a final electrode active material (i.e., with an equivalent ratio according to a final chemical formula), thereby fabricating a mixed solution. Here, specific ions may be further added to the aqueous solution with a composition ratio higher than an equivalent ratio of a final chemical formula by 0%~15%. The reason is in order to obtain a desired performance and reaction results, and to compensate a phenomenon that some components are consumed in a thermal process and an assembly process for a lithium battery that will be later explained. While the raw materials are dissolved in the aqueous solution, the entire precursors, and the raw materials for an electrode active material (one or more final metallic compounds, a dopant, metallic salt for surface-reforming, etc.) have a concentration (concentration of the entire raw materials) of 0.1M~20M.

In the case of lithium secondary batteries, final chemical formulas may include LiCoO2, LiMn2O4, LiMnO2, LiNiO2, LiNiCoO2, LiFePO4, Li3Fe2(PO4)3, LiMnPO4, LiCoPO4, LiCo1/3Ni1/3Mn1/3O2, LiNi0.5Mn0.5O2, LiNi0.5Mn1.5O4, V6O13, V2O5, Li4Ti5O12, etc. In the case of lithium primary batteries, final chemical formulas may include MnO2, etc. These materials are representatives of lithium metallic oxides and/or lithium metallic phosphorous oxides.

Here, the metallic compounds may include at least one of lithium compounds, cobalt compounds, nickel compounds, manganese compounds, iron compounds, titanium compounds, and phosphorous oxides. The lithium compounds include lithium carbonate, lithium nitrate, lithium acetate, lithium hydroxide, etc. The cobalt compounds include cobalt carbonate, cobalt hydroxide, cobalt nitrate, cobalt acetate, etc. The nickel compounds include nickel hydroxide, nickel nitrate, nickel acetate, etc. The manganese compounds include manganese hydroxide, manganese nitrate, manganese acetate, etc. Here, the respective compounds are not limited to the corresponding materials. As the iron compounds and the titanium compounds, well known materials may be used. As the phosphorous oxides, compounds including general phosphoric acid may be used.

The dopant is an element doped to induce stability of an electrode active material, and may include at least one of Mg, Al, Co, Ni, K, Na, Ca, Si, Fe, Cu, Zn, Ti, Sn, V, Ge, Ga, B, P, Se, Bi, As, Zr, Mn, Cr, Ge, Sr, V, Sc and Y, or a mixture thereof.

The metallic salt for surface-reforming may include general metallic salt for surface-reforming a lithium battery, such as Al2O3, SnO2, MgO and ZrO2.

Then, the solvent of the mixed solution is removed by either a drying process or a solvent extracting process, thereby forming a homogeneous solid dry substance. Here, the drying process may be performed for 10 minutes~72 hours at a room temperature or at a temperature of 300° C. under vacuum or atmospheric conditions. According to the drying process, a specific amount of the solvent is removed, thereby fabricating a solid dry substance such as curd.

Then, the solid dry substance is thermally processed in a single process or a multi-process, thereby synthesizing an electrode (cathode and anode) active material in the form of metallic oxides for an electrode active material of a lithium battery, lithium metallic oxides, or lithium metallic phosphorous oxides, each having undergone positive ion substitution and surface-reforming processes. Here, the thermal-processing for the solid dry substance is performed one or plural times for 30 minutes~24 hours at a temperature of 350° C.~1300° C. The thermal-processed solid dry substance is crushed to obtain a final electrode active material having a particle size of 5 nm~15 μm.

The synthesizing process is simple since an additional chelating agent is not required differently from the conventional sol-gel process. Furthermore, the synthesizing process can freely implement desired particle sizes by controlling thermal-processing conditions. That is, when the number of frequencies, time duration, and temperature for a thermal-processing are increased, particle crystallinity is increased to enhance stability. However, this causes a surface area and mobility of particles to be lowered due to an increased particle size. Therefore, electrode active material powder having a desired particle size can be fabricated by controlling thermal-processing conditions according to the purpose for a lithium battery to be fabricated based on the aforementioned principle. By using the fabricated metallic oxides for an electrode active material, lithium metallic oxides, or lithium metallic phosphorous oxides, an electrode (cathode and anode) for a lithium battery may be fabricated according to well-known methods. Lithium primary or secondary batteries may be fabricated by using the fabricated electrode.

The fabrication method for an electrode active material according to the present invention serves as a liquid phase method using no chelating agent differently from the conventional art, in which a precursor that can simultaneously undergo positive ion substitution and surface-reforming processes is used, and the fabricated metallic compound (metallic oxides and phosphorous oxides) serving as an electrode active material has an average particle size of 5 nm~15 μm. In the fabrication method for an electrode active material according to the present invention, chelating agent is not used, and positive ion substitution and surface-reforming processes are simultaneously performed, thereby simplifying entire processes and reducing fabrication costs and time. Furthermore, a particle size of an electrode active material can be controlled by changing synthesizing conditions, and the kind and amount of positive ions to be substituted can be freely controlled. Besides, the fabricated metallic compound (metallic oxide and phosphorous oxides) serving as an electrode active material has an enhanced life span and high performance by freely controlling the amount of surface layers to be reformed. In the present invention, positive ion substitution and surface-reforming processes are performed so as to enhance cycle characteristics and capacity characteristics. The positive ion substitution is performed so as to structurally stabilize cathode materials, while the surface-reforming process is performed so as to enhance a performance of an electrode active material by restricting a side reaction at a contact surface between a surface of a cathode active material and an electrolyte. However, the purposes of the positive ion substitution and surface-reforming processes are not limited thereto. Rather, the positive ion substitution and surface-reforming may be performed reciprocally, or may be performed to enhance other performances. When the positive ion substitution is much performed, an initial capacity is a little reduced even if cycle characteristics are enhanced (in the case that charging/discharging end potentials are constantly maintained). When the surface-reforming process is performed too much, cycle characteristics are enhanced, and an initial capacity is increased since a charging voltage can be increased while maintaining the cycle characteristics. For instance, $LiCoO_2$ having a charging voltage of 4.2V can be made to have a charging voltage of 4.3~4.4V through a surface-reforming process, thereby increasing an initial capacity. However, when the surface-reforming is excessively performed, the initial capacity may become small since a surface-reforming layer is electrochemically inactive, and high performance may not be implemented. Therefore, it is important to properly perform a surface-reforming process. The present invention provides a lithium battery having an enhanced positive ion substitution characteristic by properly performing positive ion substitution and surface-reforming processes. The degree and amount of positive ion substitution and surface-reforming processes for the synthesized electrode active material are determined according to thermal-processing time and the kind of metallic salt, which can be checked through an electron microscope, etc. after the synthesizing process.

EXAMPLES AND COMPARATIVE EXAMPLES

Hereinafter, the present invention will be explained in more detail with reference to examples and comparative examples. However, the examples of the present invention are merely exemplary, and the scope of the present invention is not limited thereto.

Example 1

4.5 g of Zirconium(IV) Acetate Hydroxide was dissolved in 145.5 g of distilled water. Then, lithium carbonate and cobalt nitrate were added and dissolved into the solution with a mol ratio of 1:1 so that the respective metallic ions could have a concentration of 1M. Here, a proper amount of dopant and metallic salt for surface-reforming were added and dissolved into the resulting material according to a final chemical formula.

Then, the solution was maintained at a temperature of 80° C. in an oven, thereby having moisture evaporated therefrom. In a gel state, the solution was moved to an alumina furnace thus to be thermal-processed for 12 hours at a temperature of 800° C. Then, the resulting material was crushed to fabricate a cathode active material of LiCoO2. FIG. 1 shows a scanning electron microscope (SEM) photo of the cathode active material.

Then, 9 g of the cathode active material of LiCoO2 and 6 g of acetylene black were mixed to 50 ml of NMP where 4 g of PVDF was dissolved. When a proper viscosity was obtained, the resulting material underwent a casting process on an aluminum thin plate. Then, the resulting material was dried to be rolled, thereby fabricating a cathode of LiCoO2.

Figure 2:
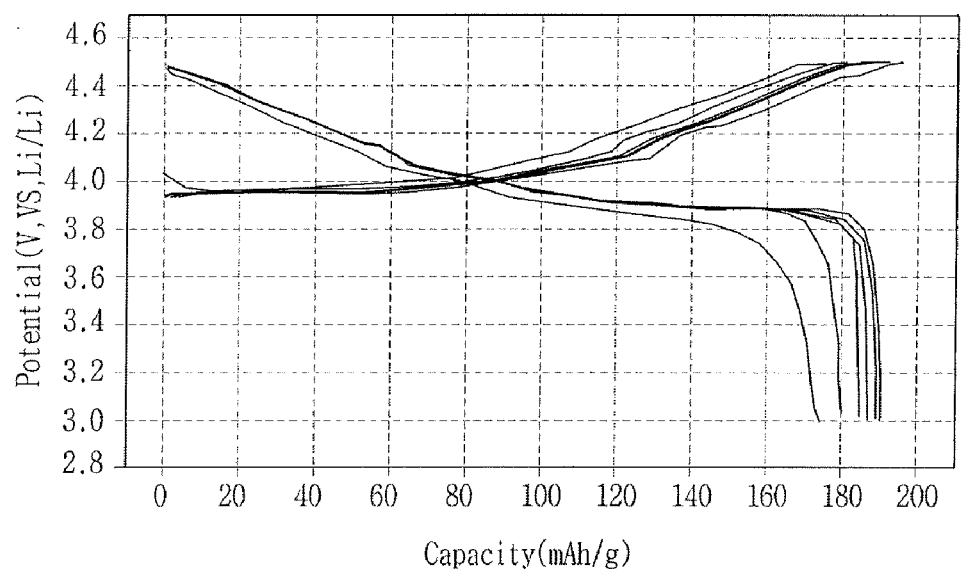
FIG. 2 is a graph showing experimental results for charging/discharging of a cathode including the cathode active material of LiCoO2 fabricated in the present invention.
Figure 3:
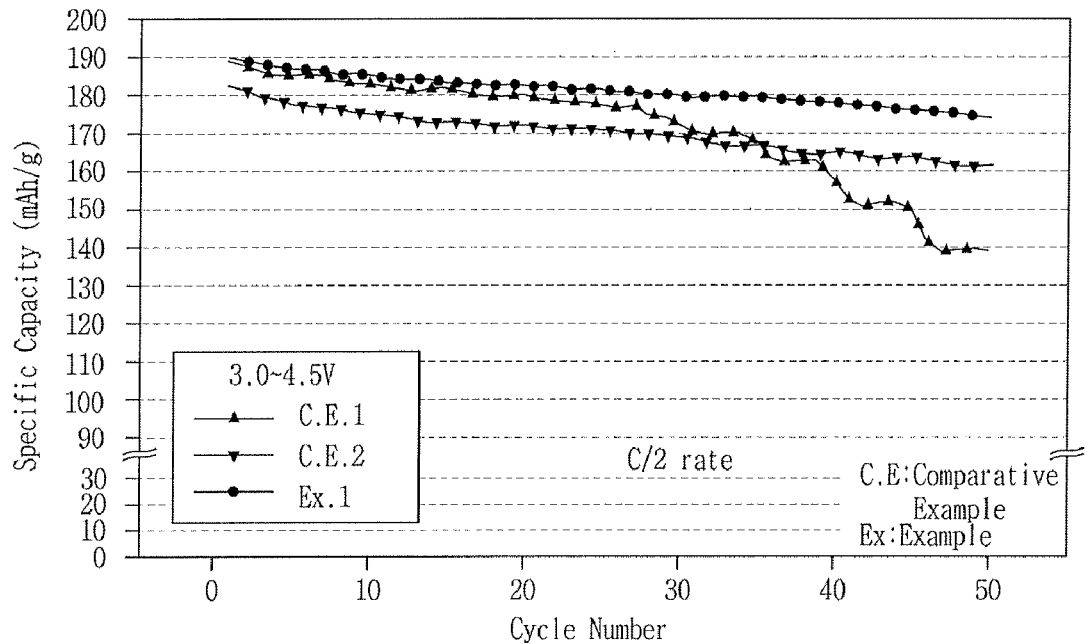
FIG. 3 is a graph comparing cycle life span characteristics of a cathode including a cathode active material of LiCoO2 fabricated in a first example of the present invention, with those of a cathode including a cathode active material of LiCoO2 fabricated in comparative examples 1 and 2.

The cathode of LiCoO2, a PP separator, and a lithium metal were used as a counter electrode, thereby constituting a half cell of a lithium secondary battery. Then, an EC:DMC solution where 1M of LiPF6 was dissolved was injected to the half cell. Then, charging/discharging behaviors and cycle life span characteristics of the resulting material were observed at potentials of 3.0~4.5V with a current density of C/2 in a constant current charging/discharging manner. The results were shown in FIGS. 2 and 3.

Comparative Example 1

In the comparative example 1, lithium-cobalt composite oxides were fabricated by using lithium carbonate and cobalt acetate by a solid phase method. A precursor was mixed to an aqueous solution with consideration of a mol ratio of lithium and cobalt of LiCoO2, final lithium-cobalt oxides, and then thermal-processed for 12 hours at a temperature of 800° C. The resulting plastic material was crushed to obtain lithium-cobalt oxides of LiCoO2.

Then, 9 g of the cathode active material of LiCoO2 and 6 g of acetylene black were mixed to 50 ml of NMP where 4 g of PVDF was dissolved. When a proper viscosity was obtained, the resulting material underwent a casting process on an aluminum thin plate. Then, the resulting material was dried to be rolled, thereby fabricating a cathode of LiCoO2. The cathode of LiCoO2, a PP separator, and a lithium metal were used as a counter electrode, thereby constituting a half cell of a lithium secondary battery. Then, an EC:DMC solution where 1M of LiPF6 was dissolved was injected to the half cell. Then, cycle life span characteristics of the resulting material were observed at potentials of 3.0~4.5V with a current density of a C/2 rate in a constant current charging/discharging manner. The results were shown in FIG. 3.

Comparative Example 2

In the comparative example 2, lithium-cobalt composite oxides doped with Al were fabricated by using lithium carbonate, cobalt acetate, and aluminum hydroxide serving as a dopant. A precursor was mixed to an aqueous solution with consideration of a mol ratio of lithium and cobalt of $LiAl_{0.1}Cu_{0.9}O_2$, final lithium-cobalt oxides, and then thermal-processed for 12 hours at a temperature of 800° C. The resulting plastic material was crushed to obtain lithium-cobalt oxides of $LiAl_{0.1}Cu_{0.9}O_2$. Other conditions and methods were the same as those of the comparative example 1. Cycle life span characteristics of the cathode active material, $LiAl_{0.1}Cu_{0.9}O_2$ were shown in FIG. 3.

Example 2

Figure 4:
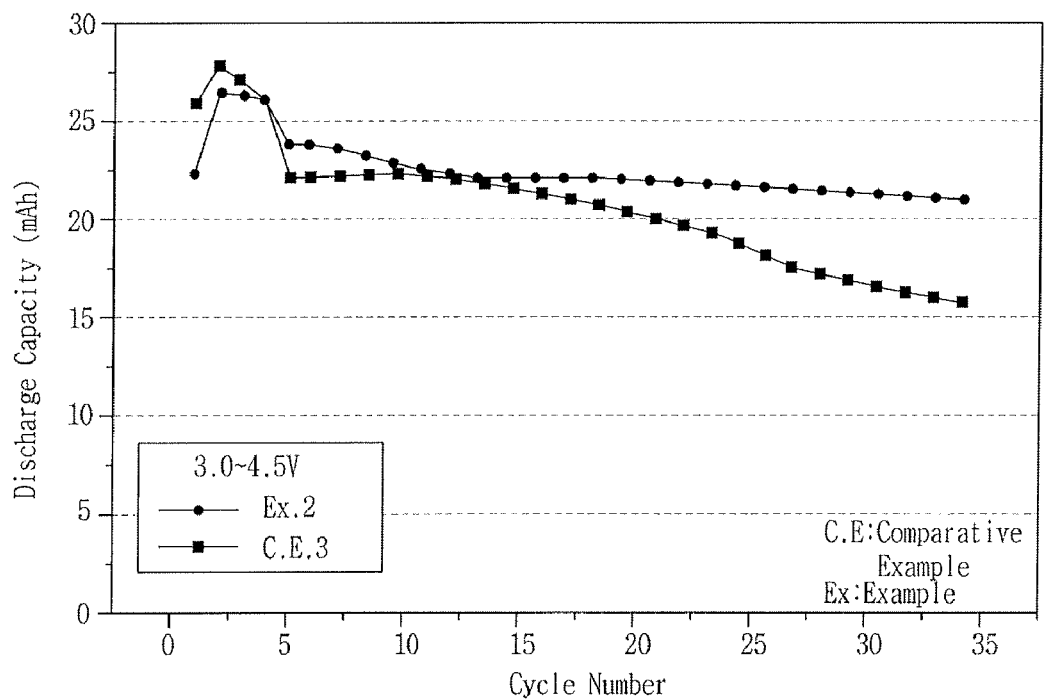
FIG. 4 is a graph comparing cycle life span characteristics of a cathode including a cathode active material of LiCo1/3Ni1/3Mn1/3O2 fabricated in a second example of the present invention, with those of a cathode including a cathode active material of LiCo1/3Ni1/3Mn1/3O2 fabricated in a comparative example 3.

4.5 g of Zirconium(IV) Acetate Hydroxide was dissolved in 145.5 g of solution. Then, lithium carbonate, cobalt nitrate, nickel nitrate, and manganese nitrate were added and dissolved into the solution with a mol ratio of 1:1/3:1/3:1/3 so that the sum of each concentration of the metallic ions could be 2M, thereby fabricating a cathode active material of $LiCo_{1/3}Ni_{1/3}Mn_{1/3}O_2$. Other conditions and methods were the same as those of the example 1 except that a thermal-processing was performed for 12 hours at a firing temperature of 900° C. Cycle life span characteristics of the cathode active material were shown in FIG. 4.

Comparative Example 3

In the comparative example 3, lithium-cobalt-nickel-manganese composite oxides were fabricated by using lithium carbonate, cobalt hydroxide, nickel hydroxide, and manganese hydroxide with a mol ratio of 1:1/3:1/3:1/3 by a solid phase method. A precursor was mixed to an aqueous solution with consideration of a mol ratio of lithium, cobalt, nickel, and manganese of $LiCo_{1/3}Ni_{1/3}Mn_{1/3}O_2$, final lithium-cobalt-nickel-manganese oxides, and then thermal-processed for 12 hours at a temperature of 900° C. The resulting plastic material was crushed to obtain lithium-cobalt-nickel-manganese oxides of $LiCo_{1/3}Ni_{1/3}Mn_{1/3}O_2$. Other conditions and methods were the same as those of the example 1 except for a firing temperature. Cycle life span characteristics of the $LiCo_{1/3}Ni_{1/3}Mn_{1/3}O_2$ were shown in FIG. 4.

Example 3

Figure 5:
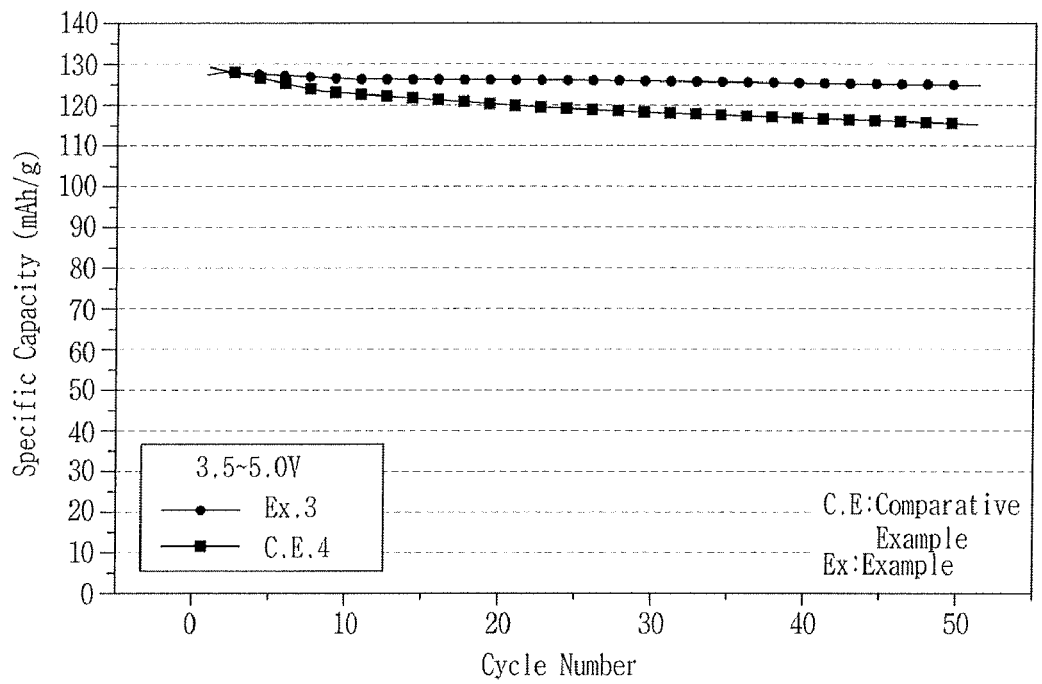
FIG. 5 is a graph comparing cycle life span characteristics of a cathode including a cathode active material of LiNi0.5Mn1.5O4 fabricated in a third example of the present invention, with those of a cathode including a cathode active material of LiNi0.5Mn1.5O4 fabricated in a comparative example 4.

4.5 g of Zirconium(IV) Acetate Hydroxide was dissolved in 145.5 g of solution. Then, lithium carbonate, nickel nitrate, and manganese nitrate were added and dissolved into the solution with a mol ratio of 1:0.5:1.5 so that the sum of each concentration of the metallic ions could be 3M, thereby fabricating a cathode active material of $LiNi_{0.5}Mn_{1.5}O_4$. Other conditions and methods were the same as those of the example 1 except that a thermal-processing was performed for 12 hours at a firing temperature of 900° C. Cycle life span characteristics of the cathode active material of $LiNi_{0.5}Mn_{1.5}O_4$ were shown in FIG. 5.

Comparative Example 4

In the comparative example 4, lithium-nickel-manganese composite oxides were fabricated by using lithium carbonate, nickel hydroxide, and manganese hydroxide with a mol ratio of 1:0.5:1.5 by a solid phase method. A precursor was mixed to an aqueous solution with consideration of a mol ratio of lithium, nickel, and manganese of $LiNi_{0.5}Mn_{1.5}O_4$, final lithium-nickel-manganese oxides, and then thermal-processed for 12 hours at a temperature of 900° C. The resulting plastic material was crushed to obtain lithium-nickel-manganese oxides of $LiNi_{0.5}Mn_{1.5}O_4$. Other conditions and methods were the same as those of the example 1 except for a firing temperature. Cycle life span characteristics of the $LiNi_{0.5}Mn_{1.5}O_4$ were shown in FIG. 5.

Example 4

Figure 6:
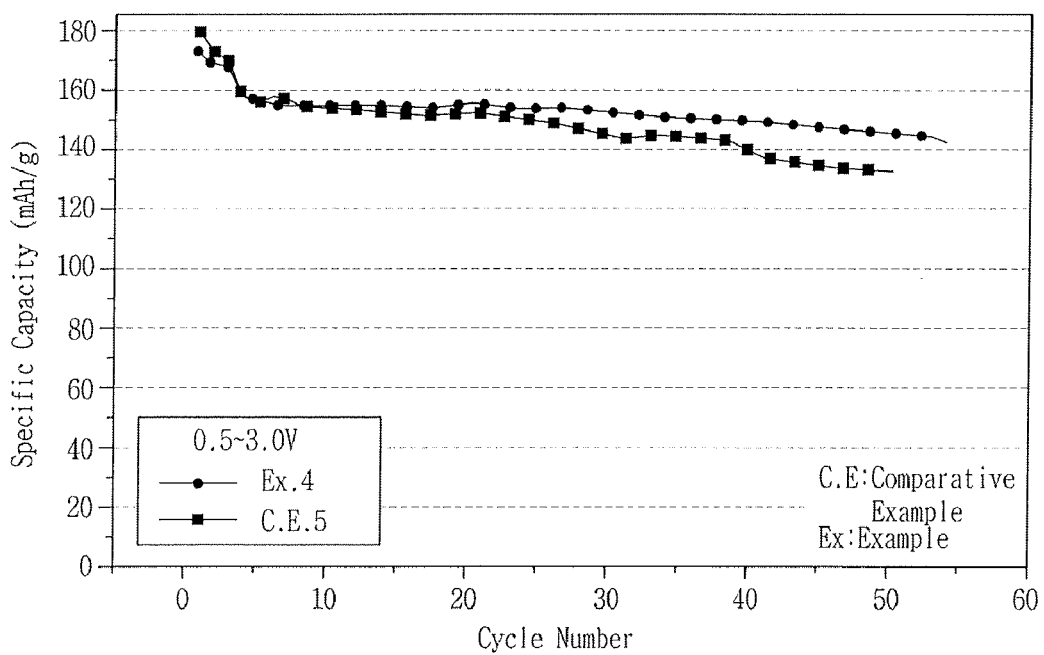
FIG. 6 is a graph comparing cycle life span characteristics of a cathode including a cathode active material of Li4Ti5O12 fabricated in a fourth example of the present invention, with those of a cathode including a cathode active material of Li4Ti5O12 fabricated in a comparative example 5.

4.5 g of Zirconium(IV) Acetate Hydroxide was dissolved in 145.5 g of solution. Then, lithium carbonate and titanium dioxide were added and dissolved into the solution with a mol ratio of 4:5 so that the sum of each concentration of the metallic ions could be 3M, thereby fabricating a cathode active material of $Li_4Ti_5O_{12}$. Other conditions and methods were the same as those of the example 1 except that a thermal-processing was performed for 12 hours at a firing temperature of 800° C. Cycle life span characteristics of the cathode active material of $Li_4Ti_5O_{12}$ were shown in FIG. 6.

Comparative Example 5

In the comparative example 5, lithium-titanium composite oxides were fabricated by using lithium carbonate and titanium dioxide with a mol ratio of 4:5 by a solid phase method. A precursor was mixed to an aqueous solution with consideration of a mol ratio of lithium and titanium of $Li_4Ti_5O_{12}$, final lithium-titanium oxides, and then thermal-processed for 12 hours at a temperature of 800° C. The resulting plastic material was crushed to obtain lithium-titanium oxides of $Li_4Ti_5O_{12}$. Other conditions and methods were the same as those of the example 1 except for a firing temperature. Cycle life span characteristics of the $Li_4Ti_5O_{12}$ were shown in FIG. 6.

As shown in FIGS. 3, 4, 5 and 6, lithium batteries of the present invention have capacity and cycle life span characteristics more excellent than those of lithium batteries of the comparative examples 1, 2, 3, 4 and 5. These results are obtained by performing positive ion substitution and surface-reforming processes for metallic ions of a cathode of the present invention with a dopant. Through the substitution and surface-reforming processes, a structurally stable cathode active material is obtained, and capacity decrease due to an unstable structure of a cathode active material is prevented. Furthermore, in the present invention, the cathode active material is thermal-processed by a single process, thereby reducing an entire thermal-process time. The synthesized material has a minute particle size of several hundreds of nm, thereby facilitating a crushing process.

The present invention has the following effects.

The present invention provides a fabrication method for a precursor capable of implementing positive ion substitution and surface-reforming processes through one process by a liquid phase method similar to a sol-gel process without using an additional chelating agent.

Also, the present invention provides a fabrication method for an electrode active material capable of implementing an excellent life span and high performance by utilizing a precursor fabricated therefrom, and a lithium battery comprising an electrode active material fabricated therefrom.

An electrode (cathode or anode) including the electrode active material according to the present invention shows an excellent capacity, cycle characteristics, life span, and processing characteristics. The lithium battery according to the present invention may be applied to various industrial fields such as each kind of small electronic appliances, communication devices, and power for electric motors, which is anticipated to lead to localization for each kind of devices and export increase.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A fabrication method for an electrode active material, comprising:
    preparing an aqueous solution by dissolving a precursor that can simultaneously undergo positive ion substitution and surface-reforming processes in water;
    mixing and dissolving a raw material for an electrode active material with a composition ratio for a final electrode active material in the aqueous solution, thereby preparing a mixed solution;
    removing a solvent from the mixed solution, thereby forming a solid dry substance;
    thermal-processing the solid dry substance; and
    crushing the thermal-processed solid dry substance;
    wherein the precursor comprises at least one of Zirconium (IV) Acetate Hydroxide, Aluminum Acetate Basic, and Chromium (III) Acetate Hydroxide;
    wherein the raw material for an electrode active material comprises at least one of lithium compounds, cobalt compounds, nickel compounds, manganese compounds, iron compounds, and titanium compounds;
    wherein no chelating agent is used in the fabrication method; and
    wherein the thermal-processing is performed more than once for 30 minutes ~24 hours at a temperature of 350° C.~1300° C.

2. The method of claim 1, wherein the raw material for an electrode active material further comprises a dopant and a metallic salt for surface-reforming.

3. The method of claim 2, wherein:
    the dopant comprises at least one of Mg, Al, Co, Ni, K, Na, Ca, Si, Fe, Cu, Zn, Ti, Sn, V, Ge, Ga, B, P, Se, Bi, As, Zr, Mn, Cr, Ge, Sr, V, Sc, Y, and a mixture thereof; and
    the metallic salt for surface-reforming comprises at least one of $Al_2O_3$, $SnO_2$, $MgO$ and $ZrO_2$.

4. The method of claim 1, wherein the final electrode active material comprises one of positive ion substituted $LiCoO_2$, positive ion substituted $LiMn_2O_4$, positive ion substituted $LiMnO_2$, positive ion substituted $LiNiO_2$, positive ion substituted $LiNiCoO_2$, positive ion substituted $LiFePO_4$, positive ion substituted $Li_3Fe_2(PO_4)_3$, positive ion substituted $LiMnPO_4$, positive ion substituted $LiCoPO_4$, positive ion substituted $LiCo_{1/3}Ni_{1/3}Mn_{1/3}O_2$, positive ion substituted $LiNi_{0.5}Mn_{0.5}O_2$, positive ion substituted $LiNi_{0.5}Mn_{1.5}O_4$, and positive ion substituted $Li_4Ti_5O_{12}$; and
    wherein the final electrode active material is surface-reformed.

5. The method of claim 1, wherein the solvent of the mixed solution is removed by either a drying process or a solvent extracting process.

6. The method of claim 2, wherein one of the raw material for an electrode active material, the dopant, and the metallic salt for surface-reforming is further added to the aqueous solution with a composition ratio higher than the composition ratio for the final electrode active material by 0%~15%.

7. The method of claim 1, wherein the mixed solution is prepared so that an entire concentration of the precursor and the raw material for an electrode active material is in a range of 0.1M~20M.

8. The method of claim 5, wherein the drying process is performed for 10 minutes ~72 hours at a room temperature or at a temperature of 300° C. under vacuum or atmospheric conditions.

9. The method of claim 1, wherein the crushed solid dry substance has an average particle size of 5 nm~15 μm.

* * * * *